(12) United States Patent
Carpenter et al.

(10) Patent No.: US 11,963,649 B2
(45) Date of Patent: Apr. 23, 2024

(54) WAREWASH MACHINE WITH VAPOR EXTRACTION UNIT

(71) Applicant: ILLINOIS TOOL WORKS INC., Glenview, IL (US)

(72) Inventors: Andrew J. Carpenter, Beavercreek, OH (US); Lyle J. Oesterling, Union, OH (US)

(73) Assignee: ILLINOIS TOOL WORKS INC., Glenview, IL (US)

(*) Notice: Subject to any disclaimer, the term of this patent is extended or adjusted under 35 U.S.C. 154(b) by 51 days.

(21) Appl. No.: 17/464,866

(22) Filed: Sep. 2, 2021

(65) Prior Publication Data

US 2021/0393105 A1 Dec. 23, 2021

Related U.S. Application Data (63) Continuation-in-part of application No. 16/222,242, filed on Dec. 17, 2018, now Pat. No. 11,122,957.

(60) Provisional application No. 62/608,908, filed on Dec. 21, 2017.

(51) Int. Cl.
*A47L 15/00* (2006.01)
*A47L 15/42* (2006.01)

(52) U.S. Cl.
CPC ....... *A47L 15/0081* (2013.01); *A47L 15/0026* (2013.01); *A47L 15/0028* (2013.01); *A47L 15/0034* (2013.01); *A47L 15/4251* (2013.01); *A47L 2501/01* (2013.01); *A47L 2501/10* (2013.01); *A47L 2501/11* (2013.01); *A47L 2501/20* (2013.01)

(58) Field of Classification Search
CPC .................................................. A47L 15/0081
See application file for complete search history.

(56) References Cited

U.S. PATENT DOCUMENTS

| | | |
|---|---|---|
| 2,063,746 A | 12/1936 | Meeker |
| 2,073,521 A | 3/1937 | Johnston |
| 2,128,008 A | 8/1938 | Meeker |
| 2,158,904 A | 5/1939 | Meeker |
| 2,217,705 A | 10/1940 | Rataiczak |
| 2,229,663 A | 1/1941 | Meeker |
| 2,707,961 A | 10/1955 | Geiger |
| 2,850,025 A | 9/1958 | Bond |
| 2,947,311 A | 8/1960 | Fox |

(Continued)

FOREIGN PATENT DOCUMENTS

| | | |
|---|---|---|
| CN | 101543390 | 9/2009 |
| CN | 101610707 A | 12/2009 |

(Continued)

OTHER PUBLICATIONS

PCT, International Search Report and Written Opinion, International Application No. PCT/US2018/065981; dated Mar. 25, 2019, 15 pages.

*Primary Examiner* — Jason Y Ko
(74) *Attorney, Agent, or Firm* — THOMPSON HINE LLP (57) ABSTRACT

A warewash machine includes a chamber with a wash zone and front, left and right access openings. At least one spray arm is disposed to spray liquid toward the wash zone. A multi-sided hood assembly is movable between a lowered and closed position for washing and a raised open position for inlet and outlet of wares. An air exchange system is provided for extracting hot water vapor from the chamber and for providing heated air into the chamber.

12 Claims, 9 Drawing Sheets

(56) References Cited

U.S. PATENT DOCUMENTS

| | | |
|---|---|---|
| 3,049,391 A | 8/1962 | Meeker |
| 3,125,105 A | 5/1964 | Geiger |
| D199,196 S | 9/1964 | Meeker |
| D205,466 S | 8/1966 | Meeker |
| 3,328,062 A | 6/1967 | Geiger |
| 3,706,317 A | 12/1972 | Fox |
| 3,844,299 A | 10/1974 | Athey |
| 3,911,943 A | 10/1975 | Athey |
| 3,949,772 A | 4/1976 | Hartmann |
| 3,949,782 A | 4/1976 | Athey |
| 4,018,239 A | 4/1977 | Caldwell |
| 4,086,929 A | 5/1978 | Focht |
| 4,086,938 A | 5/1978 | Churley |
| 4,134,413 A | 1/1979 | Noren |
| 4,187,122 A | 2/1980 | Query |
| 5,257,638 A | 11/1993 | Alvemarker |
| 5,630,438 A | 5/1997 | Hoover |
| 6,006,767 A | 12/1999 | Hecker |
| 6,338,352 B1 | 1/2002 | Raches |
| 7,021,322 B2 | 4/2006 | Kramer |
| 8,226,777 B2 | 7/2012 | Gaus |
| 8,500,917 B2 | 8/2013 | Kramer |
| 9,131,825 B2 | 9/2015 | Tameishi |
| 9,618,211 B2 | 4/2017 | Stone |
| 9,962,059 B2 | 5/2018 | Kramer |
| 2009/0101174 A1 | 4/2009 | Gaus |
| 2009/0151750 A1 | 6/2009 | Ecker |
| 2009/0242005 A1 | 10/2009 | Gaus |
| 2009/0250085 A1 | 10/2009 | Gaus |
| 2010/0139690 A1 | 6/2010 | Gaus |
| 2010/0186776 A1 | 7/2010 | Bittner |
| 2011/0132408 A1 | 6/2011 | Disch |
| 2011/0203616 A1 | 8/2011 | Berner |
| 2013/0160801 A1 | 6/2013 | Vroom |
| 2013/0240001 A1 | 9/2013 | Padtberg |
| 2013/0247940 A1 | 9/2013 | Padtberg |
| 2014/0034088 A1 | 2/2014 | Padtberg |
| 2015/0101639 A1 | 4/2015 | Heppner |
| 2017/0143182 A1 | 5/2017 | Disch |

FOREIGN PATENT DOCUMENTS

| | | |
|---|---|---|
| CN | 102458210 A | 5/2012 |
| CN | 103202684 A | 7/2013 |
| CN | 106455896 A | 2/2017 |
| CN | 106455897 A | 2/2017 |
| CN | 106714645 A | 5/2017 |
| CN | 106859550 A | 6/2017 |
| DE | 3730316 | 3/1989 |
| DE | 3019922 C2 | 9/1989 |
| DE | 102004046758 | 4/2006 |
| DE | 102005046733 | 4/2007 |
| DE | 102005048989 | 4/2007 |
| DE | 102007063618 | 10/2008 |
| DE | 102013014553 A1 | 11/2013 |
| DE | 102012211442 A1 | 1/2014 |
| DE | 102008015798 B4 | 6/2015 |
| EP | 2050381 | 4/2009 |
| EP | 2163181 A1 | 3/2010 |
| EP | 2908712 B1 | 8/2015 |
| EP | 3727123 A1 | 6/2019 |
| GB | 1121585 | 7/1968 |
| JP | H02109554 | 9/1990 |
| KR | 20060012371 | 2/2006 |
| WO | WO-2013090443 A1 | 6/2013 |
| WO | WO-2019126024 A1 | 6/2019 |

WAREWASH MACHINE WITH VAPOR EXTRACTION UNIT

TECHNICAL FIELD

This application relates generally to warewash machines and, more specifically, to a hood-type warewash machine with a controlled extraction of hot water vapor.

BACKGROUND

Warewash machines have become fairly standardized in the industry. Typically, a standard warewasher has a washing chamber with an access opening that allows wares to be placed within the chamber for a washing operation. A typical hood-type warewash machine includes a housing that, in part, defines a wash zone having front, left and right access openings, and at least one spray arm disposed above and/or below the wash zone. A multi-sided hood assembly is movable between a down/closed position for washing and an up/open position for inlet and outlet of wares. In the closed position, the multi-sided hood assembly closes the front, left and right access openings, and in the open position, the front, left and right access openings are open to permit access to the wash zone for inlet and egress of wares.

During a wash and rinse cycle of a hood-type machine, the chamber fills with hot water vapor. When the cycle is complete, and the operator raises the hood/door, a large amount of hot water vapor exits the machine, making for an uncomfortable work environment. The hot water vapor that leaves the machine also rises to the ceiling and can contact the facility walls, causing the ceiling to drip water and generally creating a hot work environment that may need to be conditioned, increasing facility costs.

It would be desirable to provide a hood-type machine that adequately addresses the issues associated with hot water vapor escape.

SUMMARY

In one aspect, a warewash machine includes a housing that at least in part defines a chamber with a wash zone, the chamber having front, left and right access openings. At least one spray arm is disposed above or below the wash zone, the spray arm configured to spray liquid toward the wash zone. A multi-sided hood assembly includes multiple wall sections, the multi-sided hood assembly movable between a lowered and closed position for washing and a raised and open position for inlet and outlet of wares, wherein in the raised and open position each of the multiple wall sections is raised. An air exchange system is fluidly connected with the chamber and includes an extraction compartment and an intake compartment, both the extraction compartment and the intake compartment located externally of the chamber. The extraction compartment includes a condenser therein, wherein an incoming water path to the machine from a cold water input passes through the condenser. The extraction compartment includes an air outlet to a surrounding ambient environment, a first air mover associated with the extraction compartment and selectively controllable for moving hot water vapor from the chamber, into the extraction compartment, over the condenser and out of the air outlet. The intake compartment includes at a least one heater therein and an air inlet from the surrounding ambient environment, and a second air mover associated with the intake compartment and selectively controllable for moving ambient air into the intake compartment via the air inlet, past the heater to be heated and into the chamber.

A. In one aspect, a warewash machine includes a housing, in part defining a chamber with a wash zone, the chamber having front, left and right access openings. At least one spray arm is disposed above or below the wash zone, the spray arm configured to spray liquid toward the wash zone. A multi-sided hood assembly includes movable front, left, right and top wall sections, and the multi-sided hood assembly is movable between a lowered and closed position for washing, and a raised open position for inlet and outlet of wares. A stationary chamber rear wall includes an outlet opening, the outlet opening fluidly connected with a vapor extraction unit at a back side of the rear wall. The vapor extraction unit includes an enclosure with a condenser therein, wherein incoming water to the machine from a cold water input passes through the condenser, wherein the enclosure includes an air outlet to surrounding ambient environment and at least one air mover selectively controllable for moving hot water vapor from the chamber, into the vapor extraction unit, over the condenser and out of the air outlet.

B. In one implementation, the machine according to preceding paragraph A, includes a controller configured for controlling a ware cleaning cycle of the machine, the ware cleaning cycle including a wash operation and a rinse operation, the controller further configured to operate the vapor extraction unit by controlling each of (i) water flow through the condenser and (ii) operation of the at least one air mover such that, at least after the rinse operation of the ware cleaning cycle is completed, hot water vapor is pulled from the chamber through the vapor extraction unit while water flows through the condenser.

C. In one implementation of the machine according to either preceding paragraph A or B, the controller operates a flow control device in the form of a valve or a pump in order to control water flow through the condenser.

D. In one implementation of the machine according to any of preceding paragraphs A-C, the vapor extraction unit includes a water flow path to permit condensed water within the enclosure to flow back into the chamber.

E. In one implementation of the machine of preceding paragraph D, the water flow path passes through the outlet opening to reach the chamber.

F. In one implementation of the machine of any of preceding paragraphs A-E, the enclosure is formed in part by a secondary housing and in part by the rear wall of the machine housing, wherein the secondary housing is mounted to the back side of the rear wall.

G. In one implementation of the machine of preceding paragraph F, a gasket is provided between the back side of the rear wall and the secondary housing.

H. In one implementation of the machine of any of preceding paragraphs A-G, the outlet opening is located on a lower portion of the rear wall, and during operation of the at least one air mover, hot water vapor is drawn from a lower portion of the chamber, while make-up air enters the chamber by passing under the bottom of the front, left and/or right wall sections of the multi-sided hood assembly so that hot water vapor within an upper portion of the multi-sided hood assembly is substantially retained in the upper portion during operation of the vapor extraction unit.

I. In one implementation of the machine of any of preceding paragraphs A-H, the controller is configured such that, upon completion of the rinse operation of the ware cleaning operation, the vapor extraction unit is operated for a set period of time.

J. In one implementation of the machine of preceding paragraph I, the controller is configured to initiate an end of cycle alert only after operation of the vapor extraction unit is completed.

K. In one implementation of the machine of any of preceding paragraphs A-J, the machine includes a powered latch mechanism movable between a hood latch state for holding the multi-sided hood assembly in the closed position and a hood unlatch state that permits the multi-sided hood assembly to be moved to the open position, wherein the controller is configured to maintain the powered latch mechanism in the hood latch state during operation of the vapor extraction unit.

L. In one implementation of the machine of preceding paragraph L, the ware cleaning cycle ends after the set time period and the controller is configured to switch the powered latch mechanism to the hood unlatch state.

M. In one implementation of the machine of any of preceding paragraphs A-L, the condenser is fluidly connected to receive incoming water from a cold water input of the machine and to deliver incoming water to a heat exchanger that exchanges heat between the incoming water and water flowing along a drain water flow path from the chamber, wherein, after passing through the heat exchanger, the incoming water is delivered into a hot water booster of the machine.

N. In one implementation of the machine of preceding paragraph M, the machine further includes a hot water input connected to deliver incoming water to a sump/tank of the chamber.

O. In another aspect, method of operating the warewash machine of any of preceding paragraphs A-N involves: carrying out a ware cleaning cycle of the machine, the ware cleaning cycle including: (i) carrying out a wash operation in which wash liquid is sprayed through wash nozzles, (ii) after step (i), carrying out a rinse operation in which rinse water is sprayed through rinse nozzles, and (iii) after step (ii), operating the vapor extraction unit by controlling each of (a) water flow through the condenser and (b) operation of the at least one air mover such that some hot water vapor is pulled from a lower section of the chamber through the vapor extraction unit while water flows through the condenser.

P. In another aspect, warewash machine includes a housing in part defining a chamber with a wash zone, the chamber having front, left and right access openings. At least one spray arm is disposed above or below the wash zone, the spray arm configured to spray liquid toward the wash zone. A multi-sided hood assembly includes movable wall sections, the multi-sided hood assembly movable between a lowered closed position for washing and a raised open position for inlet and outlet of wares, when the multi-sided hood assembly is in the lowered closed position, the multi-sided hoods assembly closes the front, left and right access openings, when the multi-sided hood assembly is in the raised open position, the front, left and right access openings are open to permit access to the wash zone for inlet and egress of wares. A vapor extraction unit mounted on the machine and fluidly connectable to the chamber, the vapor extraction unit including an enclosure with a condenser, wherein incoming water to the machine passes through the condenser, wherein an air outlet from the enclosure to surrounding ambient environment is provided, and at least one air mover is positioned for moving hot water vapor from the chamber into the vapor extraction unit over the condenser and then out of the air outlet.

Q. In one implementation of the machine of preceding paragraph P, the machine includes a controller for controlling a ware cleaning cycle of the machine, the ware cleaning cycle including a wash operation followed by a rinse operation, the controller further configured to operate the vapor extraction unit by controlling each of (i) water flow through the condenser and (ii) operation of the at least one air mover such that, at least after the rinse operation of the ware cleaning cycle is completed, hot water vapor is pulled from the chamber through the vapor extraction unit while water flows through the condenser.

The details of one or more embodiments are set forth in the accompanying drawing and the description below. Other features, objects, and advantages will be apparent from the description and drawing, and from the claims.

DESCRIPTION

Referring to FIGS. 1-5, a warewash machine 10 includes a housing 12 (e.g., with support frame and panels) in part defining a chamber 14 with a wash zone 16. The chamber 14 includes front 18, left 20 and right 22 access openings through which wares can be moved in and out of the chamber for cleaning. One or more spray arms (e.g., wash arm(s) 23a and rinse arm(s) 23b having respective wash nozzles and rinse nozzles) are disposed above and/or below the wash zone. The spray arms are configured to spray liquid toward the wash zone 16. In a typical machine, both a wash spray arm 23a and a rinse spray arm 23b may be provided, with the wash spray arm fed by a pump 24 (FIG. 5) that recirculates liquid from a collection sump or tank 26 below the wash zone, and the rinse spray arm fed by a pump (or line pressure) that delivers hot water from a hot water booster 98. The arms may, for example, be rotating arms and/or fixed arms. Upper and lower sets of arms may be implemented.

Figure 1:
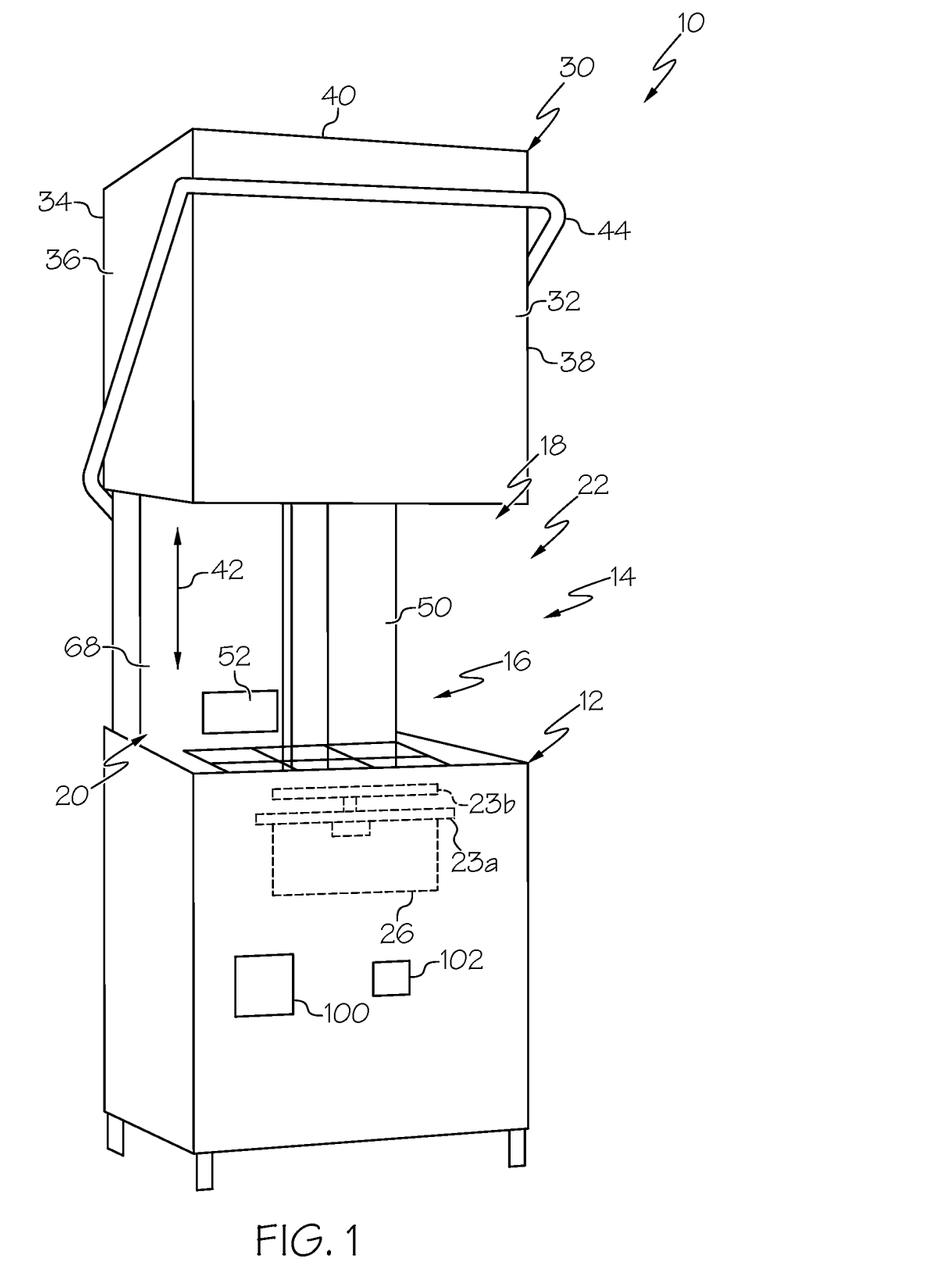
FIG. 1 shows a perspective view of a hood-type warewasher.
Figure 2:
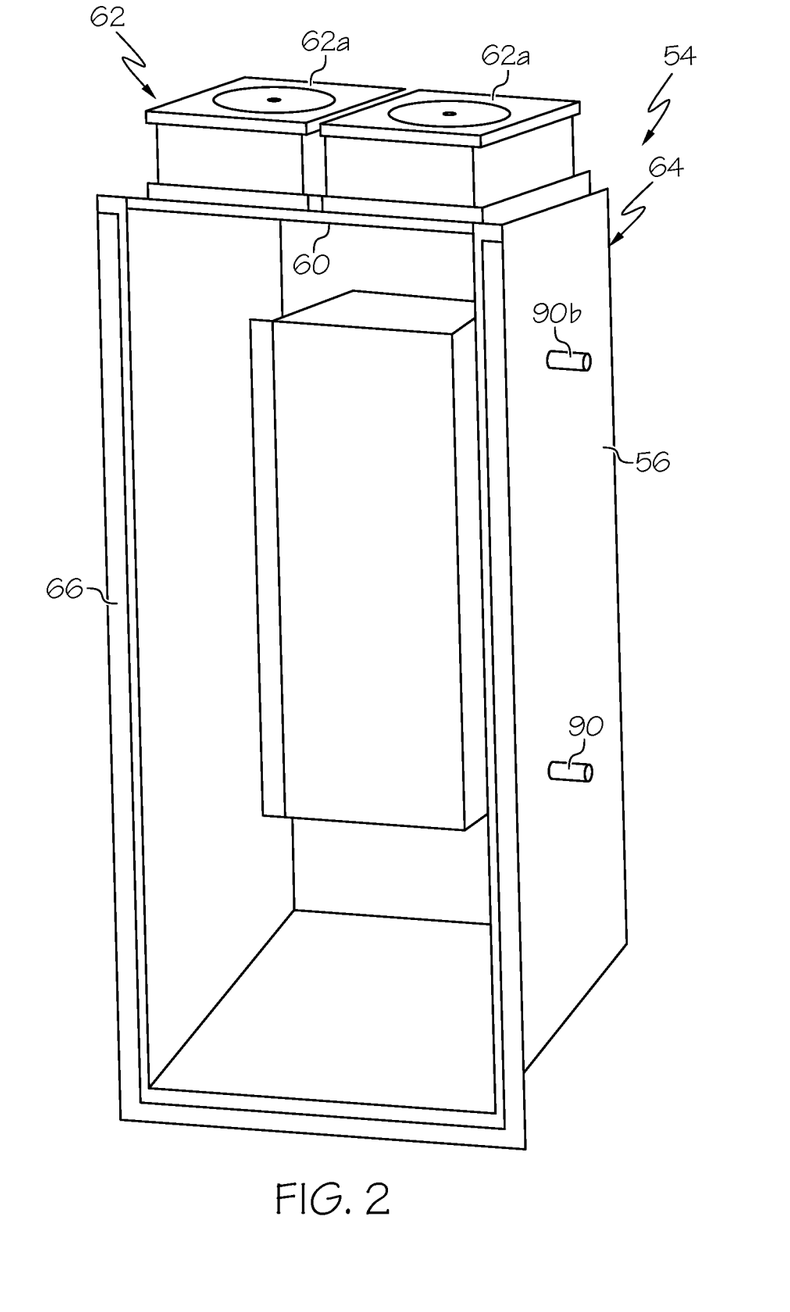
FIG. 2 shows a perspective view of a vapor extraction unit of the warewasher.

Per FIG. 1, a multi-sided hood assembly 30 includes movable front 32, left 36, right 38 and top 40 wall sections (e.g., forming a box-like hood structure that is open at the bottom) and the hood assembly may or may not have a moving back wall section 34. The wall sections move together as a unit, such that the multi-sided hood assembly is movable (per arrow 42) between a lowered closed position (e.g., per FIG. 3) for washing and a raised open position (e.g., per FIG. 1) for inlet and outlet of wares. When the multi-sided hood assembly is in the closed position, the hood assembly closes the front 18, left 20 and right 22 access openings so that cleaning sprays within the chamber will be contained during ware cleaning. When the multi-sided hood assembly is in the open position, the front 18, left 20 and right 22 access openings are open as shown in FIG. 1 to permit access to the wash zone for inlet and egress of wares. A pivot handle 44 may be provided to facilitate operator movement of the hood assembly 30.

A stationary chamber rear wall 50 is disposed at the back side of the wash chamber and, in embodiments in which the hood assembly includes a rear wall section 34, the wall 50 is at least partly behind the wall section 34 when the hood is closed. The rear wall 50 includes an outlet opening 52, and in embodiments including the rear wall section 34, the rear wall section 34 may include a cutout so as to avoid blocking the opening 52 when the hood is closed. The outlet opening 52 is fluidly connected with a vapor extraction unit 54 (FIG. 2) at a back side of the rear wall 50. The vapor extraction unit 54 includes an enclosure 56 with a condenser 58, including a condenser coil, therein.

Figure 5:
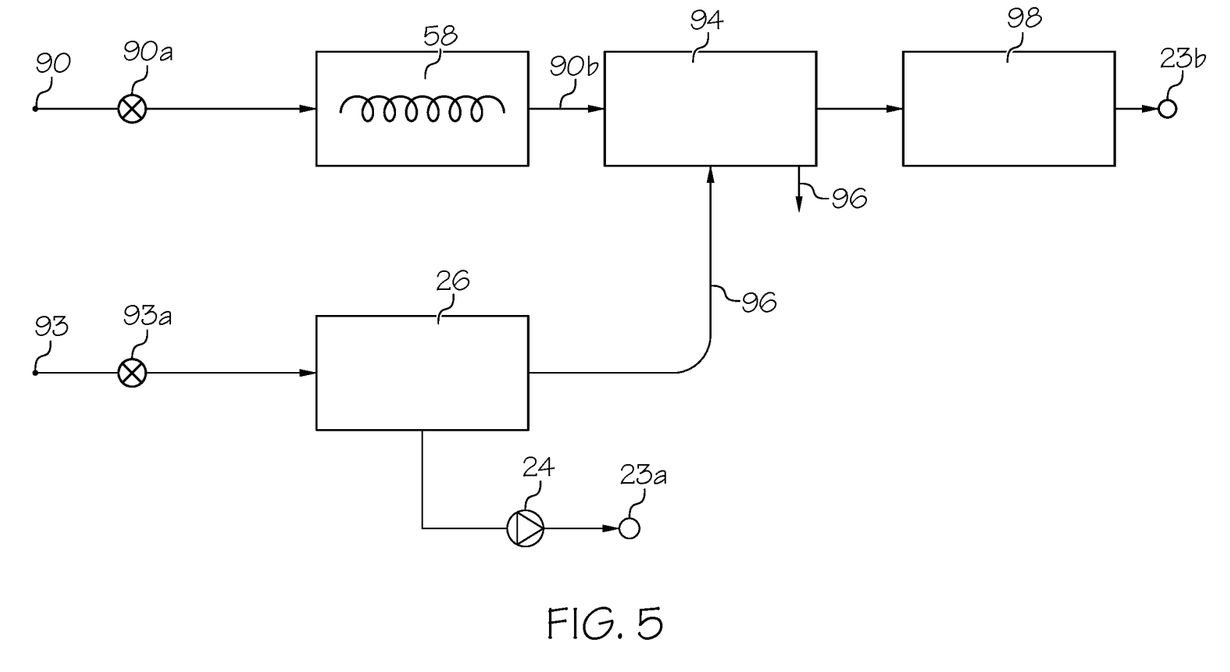
FIG. 5 shows a schematic depiction of water flow in the warewasher.

Per FIG. 5, incoming cold water to the machine from a cold water line input 90 (e.g., controlled by a solenoid valve 90*a* along the line) passes through the condenser 58. An enclosure outlet 60 (FIG. 2) to surrounding ambient environment is also provided, here at the top of the enclosure. At least one air mover 62 (e.g., here two side-by-side axial fans 62*a*) are provided for moving hot water vapor from the chamber 14 into the vapor extraction unit 54 over the condenser 58 and then to ambient through the enclosure outlet 60. Here, the axial fans 62 are mounted over the enclosure outlet 60. Other types of air movers (e.g., other fan types or blowers) could be used to move the air, and the position of such air movers could vary.

A machine controller 100 (FIG. 1) is provided for controlling ware cleaning cycles of the machine, where the cycles include both a wash operation and then a rinse operation. As used herein, the term controller is intended to broadly encompass any circuit (e.g., solid state, application specific integrated circuit (ASIC), an electronic circuit, a combinational logic circuit, a field programmable gate array (FPGA)), processor(s) (e.g., shared, dedicated, or group— including hardware or software that executes code), software, firmware and/or other components, or a combination of some or all of the above, that carries out the control functions of the machine or the control functions of any component thereof.

The controller 100 is configured to operate the water vapor extraction unit 54 by controlling each of (i) water flow through the condenser 58 (e.g., by opening solenoid valve 90*a*, or alternatively operating a pump or other flow control device) and (ii) operation of the air mover(s) (e.g., by connecting power to the fan motor) such that, at least after the rinse operation of the ware cleaning operation is completed, hot water vapor is pulled from the chamber through the vapor extraction unit while cold water flows through the condenser 58. This process results in condensation of water vapor from the moist air, such that the air that passes to the enclosure outlet 60 is not excessively hot and/or moist.

Figure 3:
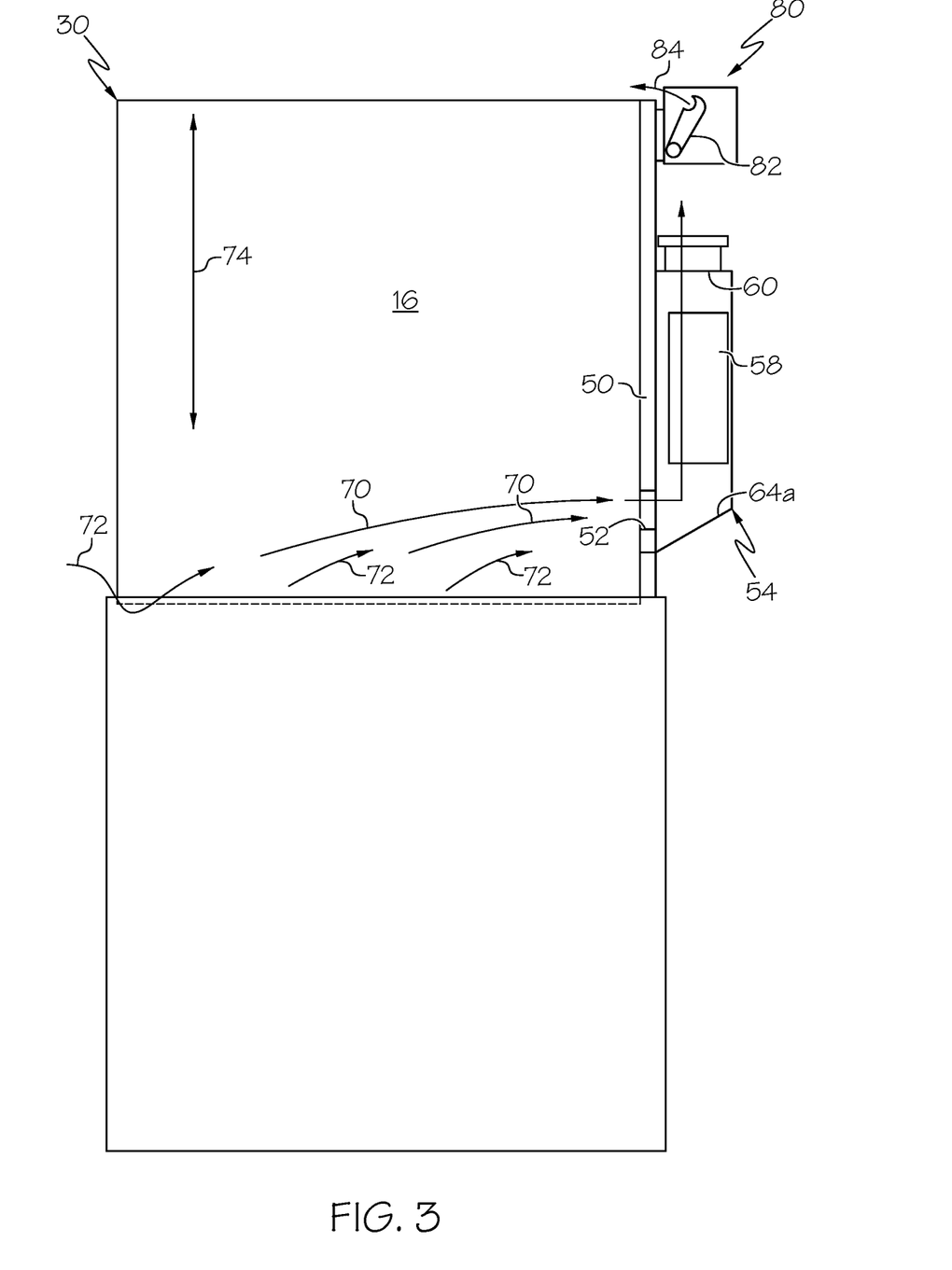
FIG. 3 shows a side elevation of the warewasher.
Figure 4:
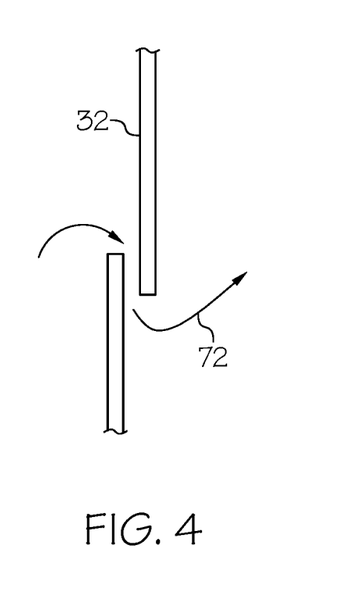
FIG. 4 shows a schematic view of make-up air flow below the lower edges of a hood wall section.

Per FIG. 3, the hot water vapor extraction unit 54 includes an internal water flow path for condensed water to flow from the unit back into the chamber. The illustrated water flow path passes through the outlet opening to reach the chamber (e.g., the bottom wall 64*a* of the enclosure housing 64 is angled to direct falling condensate back through the opening 52). Per FIG. 2, in the illustrated embodiment, the enclosure is formed in part by a secondary housing 64 and in part by the rear wall 50 of the machine housing, wherein the secondary housing 64 is mounted to the back side of the rear wall, with a gasket 66 along at least a majority of the perimeter of the housing to wall interface for sealing.

Per FIG. 1, the outlet opening 52 is located on a lower portion 68 of the rear wall (e.g., the lower ⅓ of the portion of the rear wall aligned with the chamber 12, or the lower ¼ or the lower ⅕). During operation of the fans 62, hot water vapor (indicated by arrows 70 in FIG. 3) is drawn from a lower portion of the chamber, while make-up air 72 enters the chamber by passing under the bottom of the front, left and/or right wall sections of the multi-sided hood assembly (e.g., see FIG. 4). With this arrangement, hot water vapor is also captured and maintained within an upper portion 74 of the multi-sided hood assembly during operation of the water vapor extraction unit, thereby retaining a substantial portion of the desirable heat energy within the machine from cleaning cycle to cleaning cycle. Moreover, the volume of air drawn through the vapor extraction unit after the rinse operation of a cycle may be set to help assure that moist hot vapors are retained in the upper portion 74 of the hood assembly (e.g., by drawing a volume of air that is less than the volume within the hood assembly, such as drawing a volume that is less than 50% of the overall hood volume, or less than 40% of the overall hood volume or less than 30% of the overall hood volume).

In some embodiments, the hood assembly 30 could be raised slightly (either manually or automatically by the controller) at the end of the rinse operation (as suggested by the hood assembly position in FIG. 4) in order to enhance in-flow of make-up air.

In one embodiment, the controller 100 is configured such that, upon completion of the rinse operation of a ware cleaning operation, the vapor extraction unit is operated for a set period of time (e.g., between 5 seconds and 30 seconds). The controller 100 is also configured to (i) initiate an end of cycle alert (e.g., a visible alert such as a light or indication on a machine interface 102 and/or an audible alert) only after operation of the vapor extraction unit is completed and/or (ii) lock the hood assembly down in the closed state until operation of the vapor extraction unit is completed. With respect to such a hood lock down, per FIG. 3, a powered latch mechanism 80 (e.g., solenoid or motor operated) is movable between a hood latch state for holding the multi-sided hood assembly in the closed position and a hood unlatch state (shown in FIG. 3) that permits the multi-sided hood assembly to be moved to the open position. The ware cleaning cycle ends after the set time period and the controller 100 switches the powered latch mechanism to the hood unlatch state. In one embodiment, for the purpose of the lock down, the controller 100 is configured to maintain the powered latch mechanism 80 in the hood latch state during operation of the vapor extraction unit. In the illustrated embodiment, the latch mechanism 80 includes a pivoting latch component 82 that engages some part of the hood assembly (e.g., the top rear edge of the hood assembly or a bracket as the rear of the hood assembly) when rotated in the direction of arrow 84 for the purpose of the latching.

As best seen in FIG. 5, the condenser 58 is fluidly connected to receive incoming water from the cold water input 90 of the machine (e.g., under control of valve 90*a*) and to then deliver the incoming water (via path 90*b*) to a heat exchanger 94 (e.g., with counterflow coil) that exchanges heat between the incoming water and water flowing to drain along a drain water flow path 96 from the chamber. After passing through the heat exchanger 94, the incoming water is delivered into a hot water booster 98 of the machine, which feeds the rinse arm(s) 23*b*. A hot water input 93 is connected to deliver incoming water (e.g., under control of solenoid valve 93*a*) to the sump/tank 26 of the chamber.

The described system extracts water vapor at the end of each cycle, which condenses the water, before the chamber door hood is opened. This is achieved by drawing air from the lower portion of the chamber and having it pass over the condenser (e.g., including copper coil). The condenser has the cold incoming water running through it. The energy from the hot water vapor is transferred to the cold water running through the copper coil causing the water vapor to lose temperature and condensate. The condenser may use a cross flow heat exchange method. In one example, the water is primarily running horizontally through the coil, moving up within the enclosure only after a number of horizontal passes. The hot water vapor travels vertically up through the enclosure until it finally condensates. The cold water enters the bottom of the condenser and steadily increases temperatures until it finally exits at the top.

Thus, the system reduces hot moist vapor exit upon door opening, improving the operator comfort and experience, as well as reducing room conditioning requirements. The water temperature of incoming water is also increased.

Per the illustrated embodiment, the system may function with a fully enclosed hood. With the fully enclosed hood, the goal is to maintain some hot water vapor inside the hood and only eliminate enough vapor so that it is not a problem for the operator. By keeping the hot water vapor inside the upper part of the fully enclosed hood, energy is maintained inside the machine and can be used for the next cycle. Removing primarily the vapor from the lower portion of the hood achieves this result. The positioning of the opening 52 to the unit 54, along with the CFM of the 2 axial fans, works together to allow the inside of the chamber to maintain the high-water vapor temperature while still eliminating the vapor that might typically escape when the door is opened at the end of a cycle.

It is to be clearly understood that the above description is intended by way of illustration and example only, is not intended to be taken by way of limitation, and that other changes and modifications are possible. For example, a controllable damper could be provided at or along the outlet 52, enabling a closed flow path during wash and rinse operations of a cleaning cycle, and then opening the flow path for the vapor extraction operation of the cycle.

Figure 6:
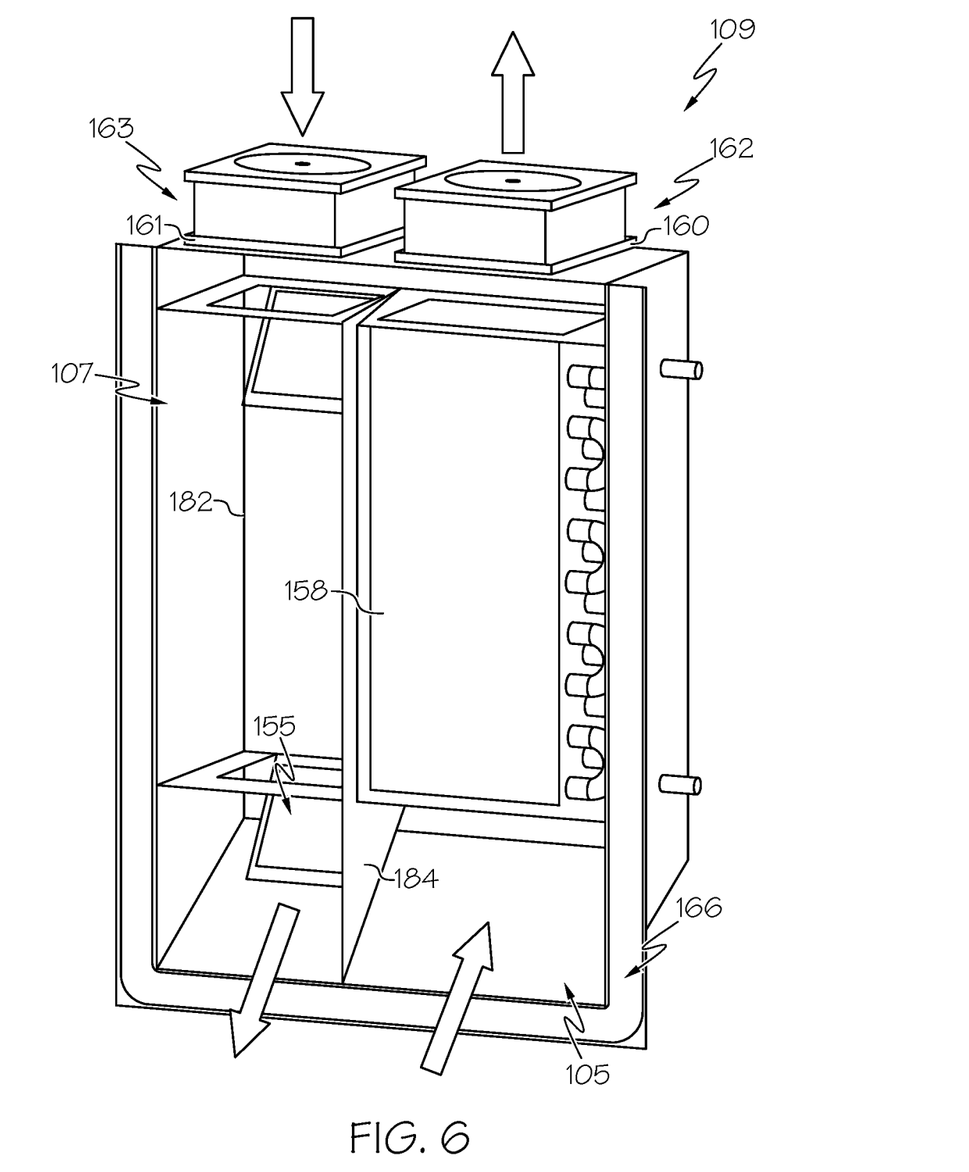
FIG. 6 shows a perspective view of an air extraction and intake unit.
Figure 7:
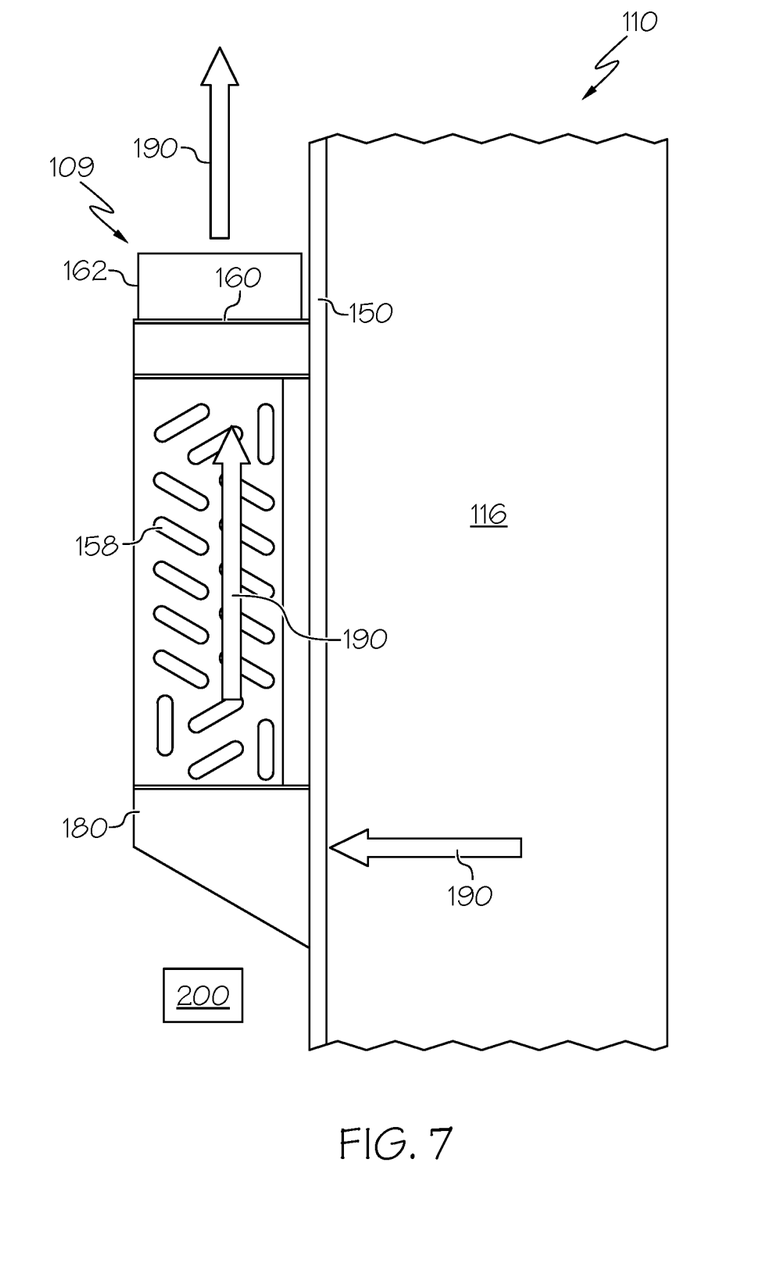
FIG. 7 shows one side view of the unit of FIG. 6 on a warewash machine.
Figure 8:
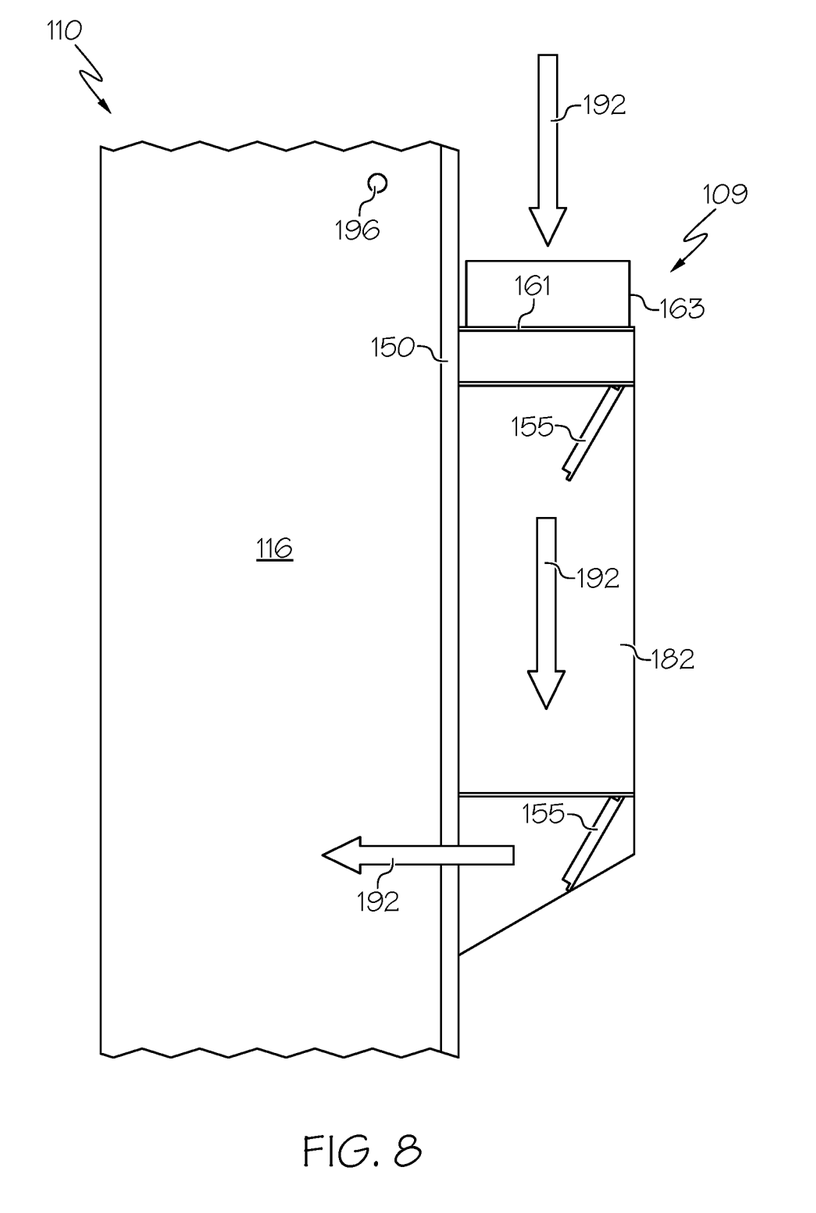
FIG. 8 shows another side view of the unit of FIG. 6 on a warewash machine.

Moreover, in an alternative embodiment, as shown in FIGS. 6-8, both an air extraction unit 105 and an air intake unit 107 are provided at the back side of the warewash machine 110, rearward of the chamber 116 and the rear wall 150. Although only parts of the machine 110 are shown in the drawings, it is understood that machine 110 is comparable to machine 110 in terms of overall configuration (e.g., with movable hood and wash and rinse systems and user interface as described above). In FIG. 6, the air extraction unit 105 and air intake unit 107 are formed with a combined housing or enclosure 156, with associated gasket 166, which housing 156 at least in part defines an extraction compartment 180 and an intake compartment 182. The compartments may be separated from each other by an internal enclosure wall 184 (e.g., creating two distinct flow paths that are substantially sealed from each other). Here, the compartments 180 and 182 are also formed in part by the back side of the warewash machine, as above.

The two units 105 and 107 form part of an air exchange system 109 that includes the extraction compartment 180 and the air intake compartment 182. Compartment 180 includes a condenser 158 therein, wherein incoming water to the machine from a cold water input passes through the condenser 158 (in a manner similar to that described above for machine 10). The air outlet 160 of compartment 180 leads to a surrounding ambient environment and one or more axial fans or other air mover 162 associated with the extraction compartment 180 and selectively controllable (e.g., by controller 200) for moving hot water vapor from the chamber 116, into the compartment 105, over the condenser 158 and then out of the air outlet 160 (e.g., per flow 190 in FIG. 7). The intake compartment 107 includes at a least one heater 155 therein and an air inlet 161 from the surrounding ambient environment, with one or more axial fans or other air mover 163 associated with the intake compartment 107 and selectively controllable (e.g., by controller 200) for moving ambient air into the air inlet, past the heater(s) 155 to be heated and then into the chamber 116 (e.g., per flow 192 in FIG. 8).

The machine controller 200 may be configured with various user selectable cleaning cycles, one or more of which involve operation of both the extraction unit 105 and the intake unit 107. By way of example, the controller 200 is configured to carry out a ware cleaning cycle that includes a wash operation and a rinse operation, with the controller further configured to operate the air exchange system 109 so as to (a) carry out an extraction operation that involves controlling each of (i) water flow through the condenser 158 and (ii) operation of the air mover 162 such that, at least after the rinse operation of the ware cleaning cycle is completed, hot water vapor is pulled from the chamber through the compartment 105 (over/past the condenser 158) and expelled from the air outlet 160 while water flows through the condenser 158; and (b) carry out a drying operation that involves controlling each of (i) energization of the heater 155 and (ii) operation of the air mover 163 such that, at least after the extraction operation of the ware cleaning cycle is completed, ambient air is pulled from through the air inlet 161 from the surrounding ambient environment and passed through the compartment 107 (over/past the heater 155) and to the chamber while the heater 155 is energized to heat the incoming air. Step (a) above represents a moisture extraction and heat recovery step of the cycle. Step (b) represents a drying step that may useful for certain ware types that tend to dry less efficiently.

In one example, the controller 200 is configured such that the drying operation occurs only after the air mover 162 is turned off to complete the extraction operation (i.e., no time overlap in air flows as between the extraction operation and the drying operation). Where a temperature sensor 196 is associated with the chamber 116, the controller 200 may also be configured such that, during the drying operation, energization of the heater 155 is controlled such that a temperature within the chamber 116 as sensed by the temperature sensor 196 does not exceed a maximum threshold. For example, the heater 155 could be deenergized when a set temperature (Tset) is reached and reenergized at a lower detected temperature (Tset−5° F.). In other examples, a more refined approach may be taken (e.g., varying the energization level of the heaters and/or turning off less than all heaters when more than one heater is present).

Figure 9:
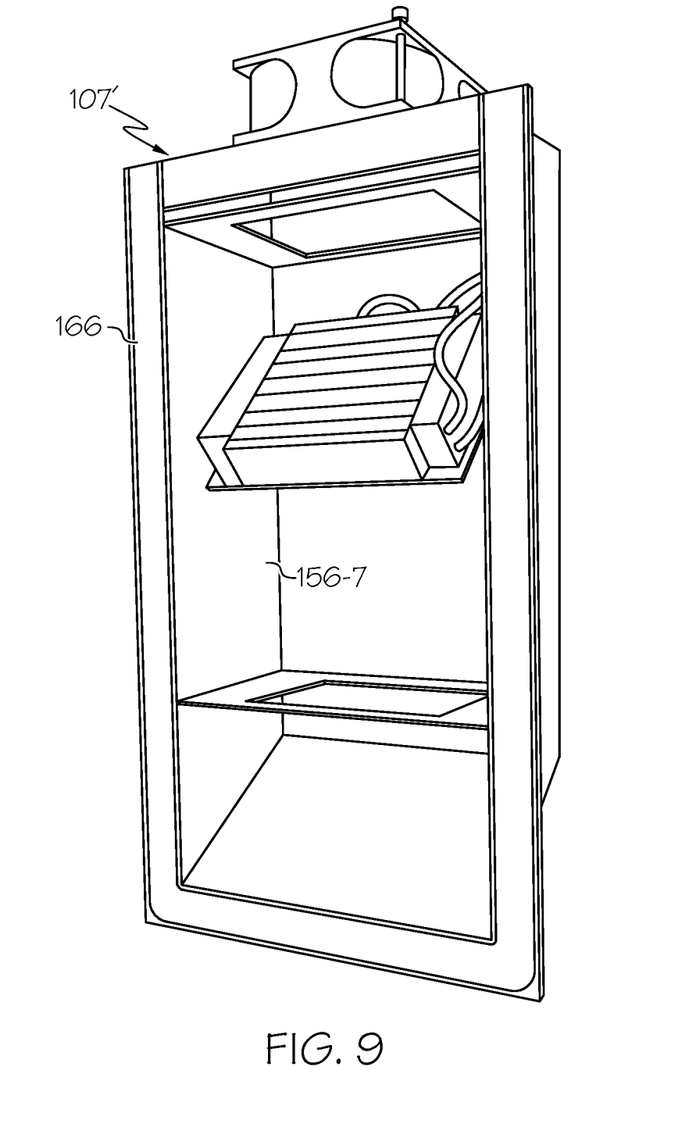
FIG. 9 shows an embodiment of an air intake unit.

While the above described embodiment of machine 110 contemplates the air extraction unit 105 and intake unit 107 formed as part of a common enclosure or housing, the two units could be formed by separate enclosures. By way of example, FIG. 9 shows an air intake unit 107' that includes its own enclosure or housing 156-7 with associated gasket 166. With this embodiment, the intake unit 107' is simply an additional component that is added to the machine 10 described above. Other changes and modifications are possible.

What is claimed is:

1. A warewash machine comprising:
a housing that at least in part defines a chamber with a wash zone, the chamber having front, left and right access openings;
at least one spray arm disposed above or below the wash zone, the spray arm configured to spray liquid toward the wash zone; and
a multi-sided hood assembly including movable front, rear, left, right and top wall sections, the multi-sided hood assembly movable between a lowered and closed position for washing and a raised and open position for inlet and outlet of wares, wherein in the raised and open position each of the front, rear, left, right and top wall sections is raised to form a space to retain hot water vapor inside the multi-sided hood assembly;
a stationary chamber rear wall, the stationary chamber rear wall including at least one air exchange opening;
an air exchange system located rearwardly of the stationary chamber rear wall, the at least one air exchange opening fluidly connected with the air exchange unit, the air exchange system including at least one secondary housing defining, at least in part, a first compartment and a second compartment;
wherein the first compartment includes a condenser therein, wherein incoming water to the machine from a cold water input passes through the condenser, wherein the first compartment includes an air outlet to a surrounding ambient environment, a first air mover associated with the first compartment and selectively controllable for moving hot water vapor from the chamber, into the first compartment, over the condenser and out of the air outlet;
wherein the second compartment includes at a least one heater therein and an air inlet from the surrounding ambient environment, a second air mover associated with the second compartment and selectively controllable for moving ambient air into the air inlet, past the heater to be heated and into the chamber.

2. The warewash machine of claim 1, further comprising:
a controller configured to carry out at least a first ware cleaning cycle of the machine, the ware cleaning cycle including a wash operation and a rinse operation, the controller further configured to operate the air exchange system as part of the first ware cleaning cycle by:
(a) carrying out an extraction operation that involves controlling each of (i) water flow through the condenser and (ii) operation of the first air mover such that, at least after the rinse operation of the ware cleaning cycle is completed, hot water vapor is pulled from the chamber through the first compartment and expelled from the air outlet while water flows through the condenser; and
(b) carrying out a drying operation that involves controlling each of (i) energization of the heater and (ii) operation of the second air mover such that, at least after the extraction operation of the ware cleaning cycle is completed, ambient air is pulled through the air inlet from the surrounding ambient environment and passed through the second compartment to the chamber while the heater is energized to heat the incoming air.

3. The warewash machine of claim 2, wherein the controller is configured such that the drying operation occurs only after the first air mover is turned off to complete the extraction operation.

4. The warewash machine of claim 2, further comprising a temperature sensor associated with the chamber, wherein the controller is configured such that, during the drying operation, energization of the heater is controlled such that a temperature within the chamber as sensed by the temperature sensor does not exceed a maximum threshold.

5. The warewash machine of claim 1, wherein the first compartment is substantially sealed off from the second compartment.

6. The warewash machine of claim 1, wherein the at least one secondary housing is a single secondary housing that defines both the first compartment and the second compartment.

7. The warewash machine of claim 1, wherein the at least one secondary housing comprises a first secondary housing that defines the first compartment and a second secondary housing that defines the second compartment.

8. A warewash machine comprising:
a housing that at least in part defines a chamber with a wash zone, the chamber having front, left and right access openings;
at least one spray arm disposed above or below the wash zone, the spray arm configured to spray liquid toward the wash zone; and
a multi-sided hood assembly including multiple wall sections, the multi-sided hood assembly movable between a lowered and closed position for washing and a raised and open position for inlet and outlet of wares, wherein in the raised and open position each of the multiple wall sections is raised;
an air exchange system fluidly connected with the chamber, the air exchange system including an extraction compartment and an intake compartment, both the extraction compartment and the intake compartment located externally of the chamber;
wherein the extraction compartment includes a condenser therein, wherein an incoming water path to the machine from a cold water input passes through the condenser, wherein the extraction compartment includes an air outlet to a surrounding ambient environment, a first air mover associated with the extraction compartment and selectively controllable for moving hot water vapor from the chamber, into the extraction compartment, over the condenser and out of the air outlet;
wherein the intake compartment includes at a least one heater therein and an air inlet from the surrounding ambient environment, a second air mover associated with the intake compartment and selectively controllable for moving ambient air into the air inlet, past the heater to be heated and into the chamber.

9. The warewash machine of claim 8, further comprising:
a controller configured to carry out at least a first ware cleaning cycle of the machine, the first ware cleaning cycle including a wash operation and a rinse operation, the controller further configured to operate the air exchange unit as part of the first ware cleaning cycle by:
(a) carrying out an extraction operation that involves controlling each of (i) water flow through the condenser and (ii) operation of the first air mover such that, at least after the rinse operation of the ware cleaning cycle is completed, hot water vapor is pulled from the chamber through the first compartment and expelled from the air outlet while water flows through the condenser; and (b) carrying out a drying operation that involves controlling each of (i) energization of the heater and (ii) operation of the second air mover such that, at least after the extraction operation of the ware cleaning cycle is completed, ambient air is pulled through the air inlet from the surrounding ambient environment and passed through the second compartment to the chamber while the heater is energized to heat the incoming air.

10. The warewash machine of claim 9, wherein the controller is configured such that the drying operation occurs only after the first air mover is turned off to complete the extraction operation.

11. The warewash machine of claim 9, further comprising a temperature sensor associated with the chamber, wherein the controller is configured such that, during the drying operation, energization of the heater is controlled such that a temperature within the chamber as sensed by the temperature sensor does not exceed a maximum threshold.

12. The warewash machine of claim 8, wherein the first compartment is substantially sealed off from the second compartment.

* * * * *